United States Patent [19]

Posey

[11] Patent Number: 4,744,845
[45] Date of Patent: May 17, 1988

[54] APPARATUS FOR SPLICING FILM TOGETHER

[75] Inventor: John Posey, McHenry, Ill.

[73] Assignee: Baxter Travenol Laboratories, Inc., Deerfield, Ill.

[21] Appl. No.: 906,726

[22] Filed: Sep. 12, 1986

[51] Int. Cl.$^4$ ............... B65H 69/06; B65H 69/08
[52] U.S. Cl. ................................. 156/159; 156/256; 156/258; 156/502; 156/510; 156/583.1; 242/58.1
[58] Field of Search ............... 156/159, 304.6, 502, 156/507, 256, 258, 510, 583.1; 242/58.1

[56] References Cited

U.S. PATENT DOCUMENTS

| | | | |
|---|---|---|---|
| 3,473,995 | 10/1969 | Schott, Jr. ........................... | 156/513 |
| 3,508,989 | 4/1970 | Lawrence et al. .................. | 156/73.1 |
| 4,398,982 | 8/1983 | Witerski et al. .................... | 156/304.6 |
| 4,417,942 | 11/1983 | Kincheloe .......................... | 156/159 |
| 4,433,527 | 2/1984 | Ramsey et al. ..................... | 53/548 |

FOREIGN PATENT DOCUMENTS 2729751 1/1979 Fed. Rep. of Germany ...... 156/159

Primary Examiner—Michael Wityshyn
Attorney, Agent, or Firm—Mary R. Jankousky; Paul C. Flattery; Robert M. Barrett

[57] ABSTRACT

An apparatus for splicing film together is provided. The apparatus includes a first jaw and a second jaw, the jaws cooperating to clamp two film ends together. A heat sealer for sealing the two film ends together is located in the first jaw. A rotatable block is located in a second jaw. The rotatable block is rotatable to a cutting position and a sealing position. In the cutting position, a side of the rotatable block having a slot faces upwardly and contacts the film. In the sealing position a side of the rotatable block having a back up member faces upwardly and contacts the film. When the film is clamped between the jaws and the rotatable block and is in the cutting position, a portion of the block, and accordingly the film, extends outwardly from a horizontal plane defined between the jaws. Therefore, after the film is cut along the slot in the block and the block is rotated to the sealing position, the severed ends of the film overlap. A method of splicing film is also provided.

25 Claims, 3 Drawing Sheets

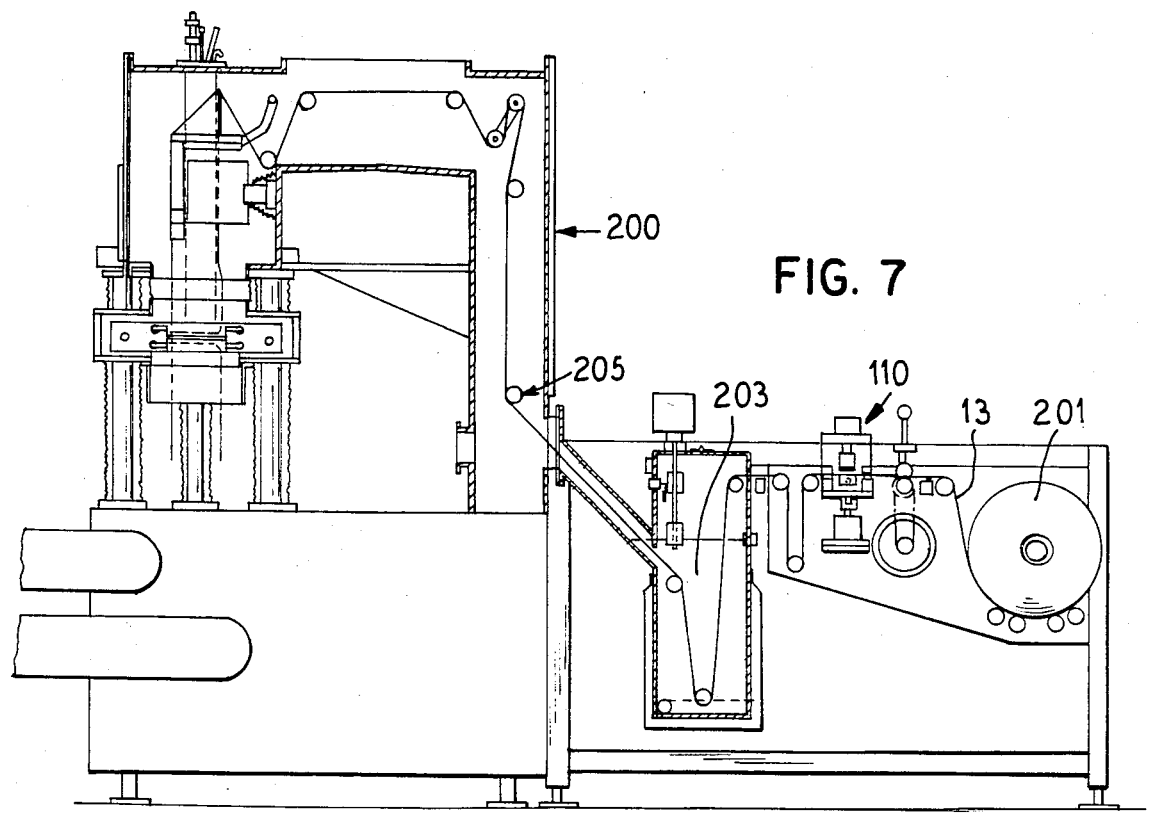
FIG. 7
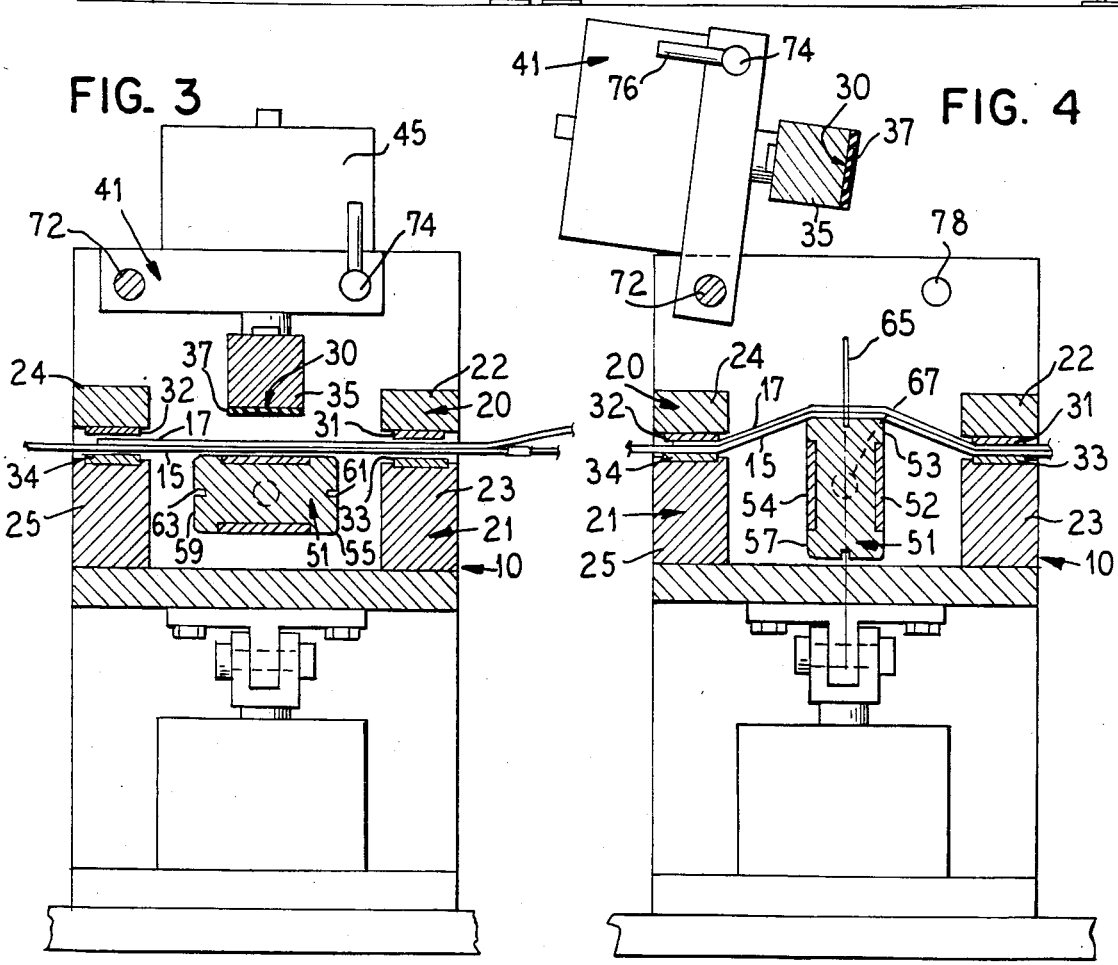
FIG. 3
FIG. 4

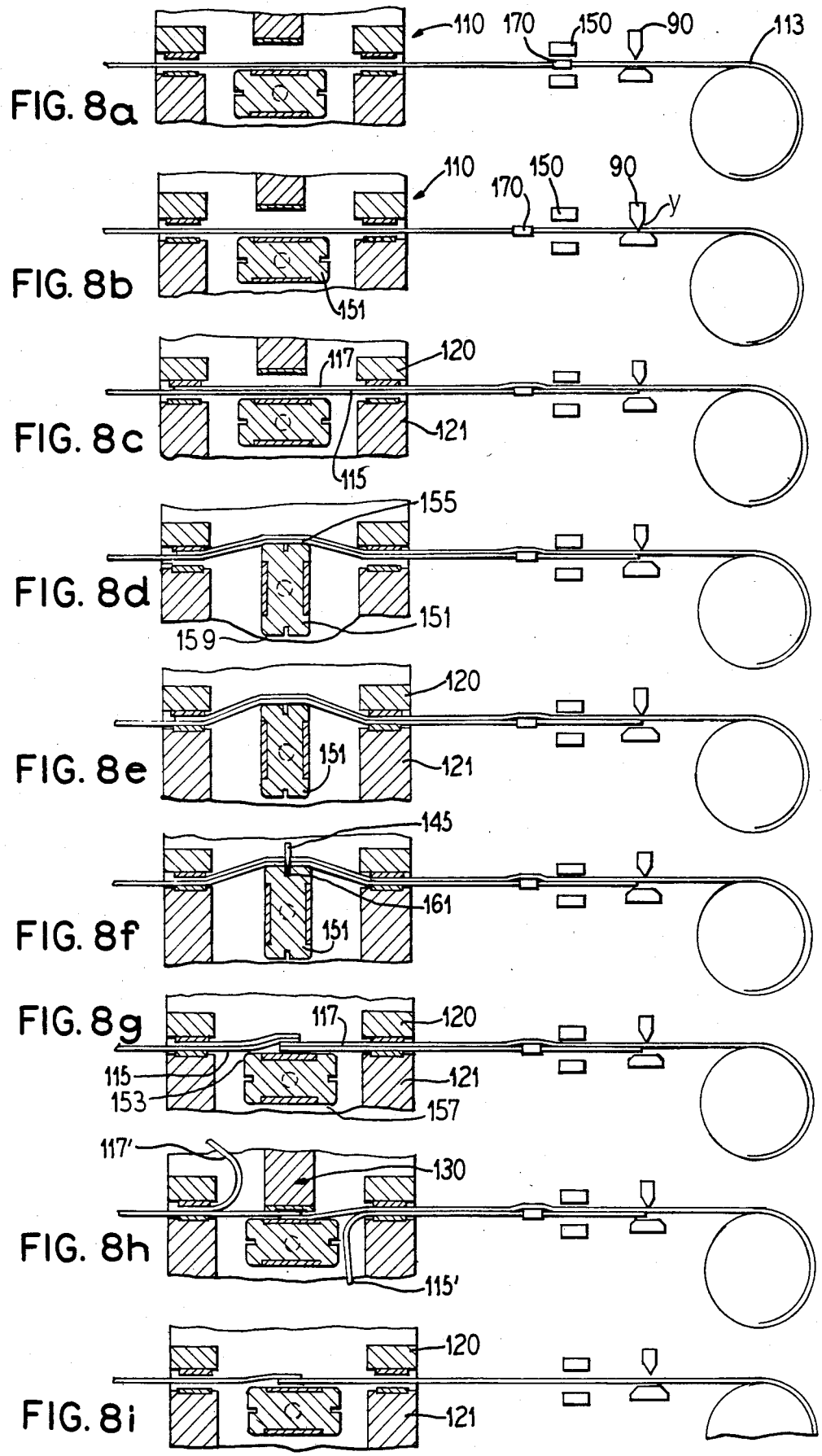

APPARATUS FOR SPLICING FILM TOGETHER

BACKGROUND OF THE INVENTION

This invention relates generally to apparatus for cutting and sealing a web of film. More specifically, this invention relates to an apparatus for splicing a web of film.

In the manufacture of rolls of plastic film it is difficult to make a roll that is contiguous from the beginning of the roll to the end of the roll. This is due in part to the machinery for making a roll of film which may not be able to produce a sufficiently large roll of film for the end users needs. Moreover, during the film making and rolling process the film can break, can develop holes, blemishes, and other defects, or may include areas that must be cut out. Accordingly, it is usually necessary to splice plastic film together in order to produce a roll of film.

Furthermore, typically the end user of the film must splice the film. Indeed, if one wants a continuous flow of film into his machine he must splice two webs of film together when the end of a roll of film is reached so that a second roll of film can be fed into the machine. Additionally, it may be necessary to splice a web of film because the film breaks or has blemishes or other areas that must be cut out.

Typically, two methods of splicing a web of film are utilized; taping the film together; and electronic splicing. In tape splicing, the two ends of the film are secured together by a piece of tape or other adhesive means. In electronic splicing, the two ends of film are sealed together by heat sealing, impulse sealing, or other means of melting the two ends of the web of film together.

Typical prior art methods of electronic splicing are expensive and time consuming. Accordingly, tape splicing is an especially popular method for splicing two ends of film together; particularly in view of economic reasons.

Tape splicing, however, cannot be utilized for all types of film applications. For example, in the aseptic packaging area, the use of tape splicing causes sterility problems. The area beneath the tape or adhesive that seals the two ends of film together can be a harbor for bacteria and other contaminants. Accordingly, it is not desirable to utilize tape splicing to splice film that is fed into an aseptic machine or that is to be utilized in an aspetic process. Therefore, if a web of film is to be utilized in an aseptic process to make sterile product, any tape splices must be removed from the web of film before it is fed into the aseptic process. Moreover, any splicing to be done i.e., to change rolls, cannot be done with a tape splice.

Because the splicing apparatus is typically utilized to either manufacture film or to manufacture products from the film, it is necessary for any such splicing machine to be quick, economic, and minimally disruptive of the process. As set forth above, there are situations where there is a need for an electronic splicing method that meets these requirements. However, as stated above, some prior electronic splicers suffer the drawback of being too expensive or too disruptive of the manufacturing process. Furthermore, some electronic splicers do not provide a strong seal between the ends of the film and the seal can fail. For example, some electronic splicers do not seal the two film ends across their entire surfaces and accordingly flaps between the film can occur; this makes the resultant film seal weaker.

Accordingly, there is a need for an improved apparatus for splicing film together.

SUMMARY OF THE INVENTION

The present invention provides an apparatus for splicing film together. The apparatus includes a first jaw and a second jaw, the jaws cooperating to clamp two film ends together. A sealing means for sealing the two film ends together is located in the first jaw. A rotatable member is located in a second jaw. The rotatable member is rotatable to a cutting position and a sealing position. In the cutting position, a side of the rotatable member having a slot faces upwardly and contacts the film. In the sealing position a side of the rotatable member having a back up member faces upwardly and contacts the film.

Preferably, the rotatable member is a rectangular block with the width of the side having the backup member being greater than the width of the side having the slot. When the film is clamped between the jaws and the rotatable member is in the cutting position, a portion of the block, and accordingly the film, extends outwardly from a horizontal plane defined between the jaws. Therefore, after the film is cut along the slot in the block and the block is rotated to the sealing position, the severed ends of the film overlap. Accordingly, when the ends of the film are sealed they are overlapped.

A method for splicing two film ends together is also provided. The method comprises the steps of: passing one film end between a splicer having a first jaw and a second jaw, the first jaw including sealing means for sealing the two film ends together and a rotatable block having at lease one cutting surface and at least one sealer back up surface; passing a second film end between the first and second jaws; causing the cutting surface to contact one side of at least one film end, moving the jaws together and clamping the two film ends together; severing the two film ends along a slot in the cutting surface; rotating the block so that the back up surface contacts a side of at least one film end; peeling back a scrap layer from the first film end and a scrap layer from the second film end; and sealing the two remaining layers of film together with the sealing means.

Accordingly, an advantage of the present invention is that it provides an apparatus for splicing together film.

Furthermore, an advantage of the present invention is that it provides an electronic apparatus for splicing film that is minimally disruptive of the process through which the film is being processed and is economical.

A still further advantage of the present invention is that it provides an apparatus for splicing film that can be either utilized to produce a roll of film or utilized in processing rolls of film into a product, e.g., in a packaging machine.

Moreover, an advantage of the present invention is that it provides an apparatus for splicing film in an aseptic packaging process.

Still another advantage of the present invention is that it provides an improved apparatus and a method for splicing film.

Another advantage of the present invention is that it provides an apparatus for splicing film that allows one to properly register the film being spliced.

Furthermore, an advantage of the present invention is that the film splicer produces a strong seal between the two ends of film.

Additional features and advantages will be described in and will be apparent from the detailed description of the present preferred embodiments and from the drawings.

BRIEF DESCRIPTION OF THE DRAWINGS

FIG. 3 illustrates a cross-sectional view of the splicer of the present invention.

FIG. 4 illustrates a cross-sectional view of the splicer of FIG. 3 with the splicer in the cutting position.

FIG. 7 illustrates a schematic view of a packaging machine including the splicer of the present invention.

FIGS. 8a-8i illustrate a schematic of the process of removing a tape splice from a web of film utilizing the splicer of the present invention.

DETAILED DESCRIPTION OF THE PRESENTLY PREFERRED EMBODIMENTS

The present invention provides an apparatus and method for splicing film. As used herein, "splicing" means to seal together two ends of film together. The film can either be from separate rolls, sheets, or webs or can be from a contiguous sheet that is cut to produce two ends. As used herein, "film" means a flexible material such as plastic that it utilized in sheets, rolls, or webs to, for example, package products, wrap products, or the like.

The apparatus of the present invention provides a specifically advantageous way of splicing a web of film that is to be utilized in an aseptic process. For example, as illustrated in FIG. 7, the apparatus provides an apparatus and method for splicing a web of film that is to be fed into an form, fill and seal packaging machine to produce a flexible package for housing a product. Of course, the splicer can be used in a variety of other process and applications.

Figure 1:
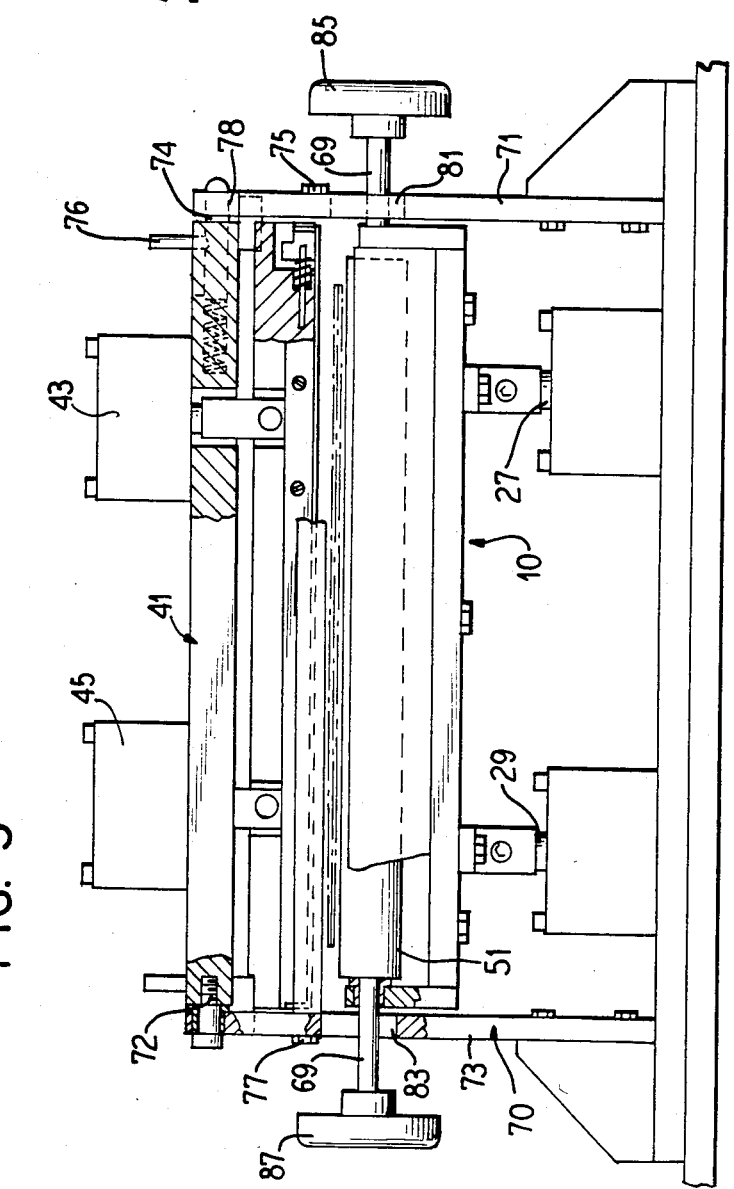
FIG. 1 illustrates a perspective view, with parts broken away, of the apparatus for splicing film of the present invention.

Referring now to the FIGS. 1, 3 and 4, the splicer 10 of the present invention is illustrated. The splicer 10 is constructed so that as a web of film if processed either to create a roll of film or be created into a product the film passes through the splicing apparatus 10 allowing one to splice the film when needed.

Preferably the splicer 10 is oriented at an angle with respect to the web of film, i.e. the splicer is not perpendicular to the sides of the web of film. By orienting the splicer 10 at an angle with respect to the film, when the film is spliced together the resultant seal line between the spliced ends of the film is not perpendicular to the sides of the web of film. This results in a film 13 that has better flow characteristics through the processing machine because the film and seal afford smooth film flow point contact rather than edge contact. Of course, if desired, the splicing apparatus 10 can be oriented perpendicular to the sides of the web of film.

Referring specifically to FIGS. 3-4, a cross-sectional view of the splicer 10 is illustrated. As illustrated, the splicer 10 includes a first jaw 20 and a second jaw 21. The first jaw member 20 includes bar members 22 and 24 and the second jaw 21 includes bar members 23 and 25. The bar members 22, 23, 24 and 25 are utilized to clamp the two film ends 15 and 17 that are to be sealed together (i.e. spliced) between the jaws 20 and 21. To this end, the bar members 22 and 24 and 23 and 25 include gripper members 31, 32 and 33, 34 respectively. The gripper members 31, 32 and 33, 34 preferably are elastomeric so that the ends of the film are not damaged when they are clamped between the jaws 20 and 21.

Preferably, the first jaw member 20 is fixedly secured and the second jaw member 21 is moveable towards and away from the first jaw 20. This construction affords less pressure and potential damge to the film. To this end, the bar members 22 and 24 of the first jaw 20 are secured at each of their ends to a frame 70. As illustrated in FIG. 1, the frame 70 includes a first side 71 and a second side 73. The bar members 22 and 24 are secured to the frame 70 by bolts 75 and 77.

As previously stated, the second jaw 21 is moveable towards the first jaw 20. To this end, the second jaw 21 is mounted on two air cylinders 27 and 29. Accordingly, when the film is to be clamped between the jaws 20 and 21, the air cylinders 27 and 29 urge the second jaw 21 against the first jaw 20 clamping the web of film between the jaws. Of course, if desireable, both jaws 20 and 21 can be constructed so that they are moveable with respect to each other.

Located within the first jaw 20 is a heat sealer 30. The heat sealer 30 includes heat sealing bar 35 and a cover 37. The heat sealer 30 is utilized to seal the two film ends 15 and 17 together. Accordingly, the heat sealer 30 functions to seal two separate webs of film together such as when one is changing film rolls or splicing together two ends of a web of film that is severed.

In the embodiment illustrated, the heat sealer 30 comprises an impulse heat sealing means. However, any other means for sealing film can be utilized, e.g. a static heat sealing system, RF welding, etc. Likewise, the heat sealer 30 can comprise any impulss heat sealer known in the art. The cover 37 can also be any cover known in the art for preventing film from sticking to the heat sealing means, e.g. Teflon cloth, i.e., a synthetic resin polymer cloth.

The heat sealer 30 includes a frame member 41 upon which air cylinders 43 and 45 are supported. The heat sealer 30 is moveable with respect to the first jaw 20. To this end, the heat sealer 30 is urged downwardly by the air cylinders 43 and 45 against the film to be sealed together. As discussed in detail below, and illustrated in FIG. 5, after the two film ends 15 and 17 are in the proper orientation, the heat sealer 30 can seal the film together.

Figure 2:
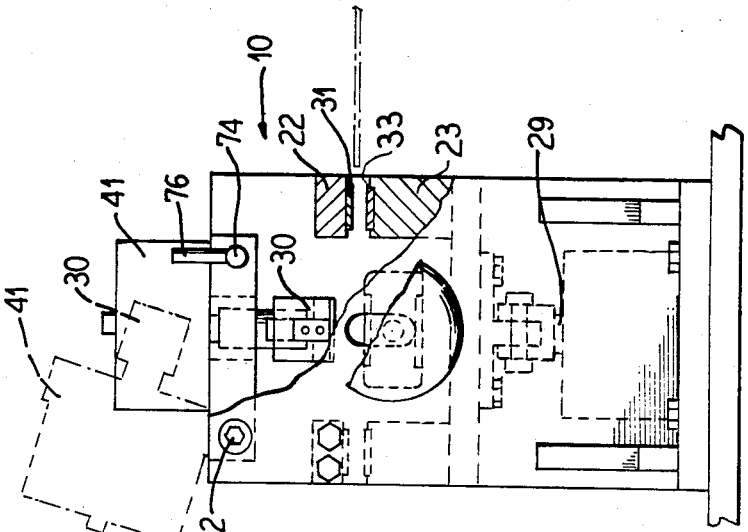
FIG. 2 illustrates a side-elevational view with parts broken away of the splicer of the present invention.

The frame member 41, and thereby the heat sealer 30, is preferably rotatably mounted to the frame 70. To this end, the frame member 41 is mounted to the sides 71 and 73 of the frame 70 by a pin 72. The frame member 41 is also mounted to the frame 70 by a spring biased pin 74. The spring biased pin 74 includes a handle member 76 that allows one to bias the pin 74 inwardly so that the pin is removed from an aperture 78 in the frame 70. Once so removed, the heat sealer 30 can be rotated outwardly from within the first jaw 20 as illustrated in FIGS. 2 and 4. As discussed in more detail below, this allows one to access the film so that the film can be severed. Of course, if desired, the heat sealer 30 can be secured between the frame 70 and not rotatable therein.

Located within the second jaw 21, is a block 51. The block member 51 includes sides 53, 55, 57, and 59. The block 51 has an elongated rectangular shaped construction. In the preferred embodiment illustrated, two of the sides 53 and 57 of the block 51 define a backup surface for the heat sealer 30. To this end, the sides 53 and 57 include an elastomeric faces 52 and 54 respectively. The elastomeric faces 52 and 54 of the sides 53 and 57 cooperate with the heat sealer means 30 to seal the two film ends 15 and 17 together. Accordingly, when the backup member sides 53 or 57 are oriented upward, i.e. contact the film, the block 51 is in the sealing position.

The two other sides 55 and 59 of the block 51 include elongated slots 61 and 63 respectively. The slots 61 and 63 in the sides 55 and 59 of the block 51 are utilized to cut the two film ends 15 and 17. To this end, the slots 51 and 53 define a path that runs, preferably, the length of the block 51 for receiving, as illustrated in FIG. 4, a portion of a knife 65 that it utilized to sever the two film ends 15 and 17 to be spliced.

The block 51 is rotatably mounted between the jaws 21 and frame sides 71 and 73. To this end, the block 51 includes an aperture 67 that receives a rod 69. The rod 69, preferably, extends through the block 51 and is received in slots 81 and 83 in the sides 71 and 73 of the frame 70. Of course, the rod 69 can comprise two pieces that are only received within a portion of the aperture 67 that receives the rod. The rod 69 includes at each end a handle 85 and 87. The handles 85 and 87 allow one to rotate the rod 69 and accordingly the block member 51. Of course, if desired the rod 69 can include only one handle.

As previously stated, the bottom jaw 21 is movably secured within the frame 70. To this end, the sides 71 and 73 of the frame include slots 81 and 83. The slots 81 and 83 allow the rod member 69 to move therein so that the second jaw 21 can move towards the first jaw 20.

The block 51 is constructed so that when the side 55 or 59 of the block 51 including the slots 61 and 63 is facing upwardly and contacting a portion of one of the two ends of film 15 and 17 the film extends outwardly from a horizontal plane defined between the jaw members 20 and 21. This is due to the fact that the back-up sides 53 and 57 of the block 51 are wider than the slotted sides 55 and 59. Accordingly, the two ends of film 15 and 17 are tented upwardly in the splicer 10 when the sloted sides 55 or 59 contact the film and the jaws 20 and 21 clamp the film together. This position, i.e. when either of the sloted sides 55 or 59 is facing upward and the jaws 20 and 21 are clamped together, defines the cutting position for the splicer 10. In use, when the splicer 10 is in the cutting position and the block 51 is oriented so that one of the slotted sides 55 or 59 contacts a portion of the ends of the film 15 and 17 and the jaws are clamped together, the film can be severed as illustrated in FIG. 4.

Figure 6:
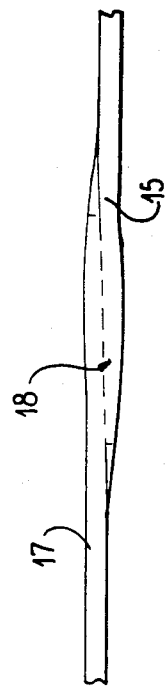
FIG. 6 illustrates a perspective view of a seal between two film ends created by the splicer of the present invention.
Figure 5:
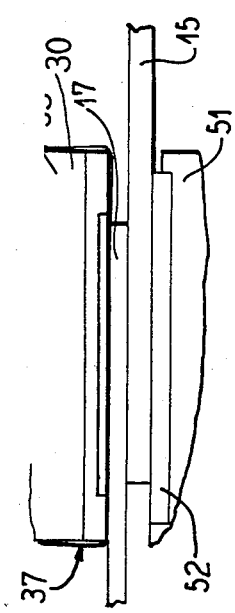
FIG. 5 illustrates a perspective view of a portion of the splicer as it seals two film ends together.

Because the film 15 and 17 is tented upwardly when the jaws 20 and 21 are clamped together and the slotted sides 55 and 59 of the block 51 are oriented upwardly, i.e., when the splicer 10 is in the cutting position, after the film is severed along the slot 61 or 63 and the block 51 is rotated to the sealing position, as illustrated in FIG. 5, the severed ends of the web of film 15 and 17 overlap. This is due to the fact that the back up side 53 and 57 surface, when the back up member is oriented upward (i.e. contacts the film), is in substantially the same horizontal plane as the contact points between the jaw members 20 and 21. Accordingly, as illustrated in FIGS. 5 and 6, when the heat sealer 30 seals the film 15 and 17 the severed ends are overlapped and sealed together. This provides a strong and secure seal 18 between the two film ends 15 and 17.

Once the film has been severed and the block 51 rotated to the sealing position, the waste portions of the film can be peeled back. After the waste portions are peeled back the heat sealer 30 can be actuated to seal the ends of the film together. To this end, in the embodiment illustrated, the air cylinders are actuated causing the heat sealer 30 to contact the film. After the heat sealer 30 has sealed the film and the film has cooled sufficiently, the jaws 20 and 21 can be opened and the film can continue through the process.

Referring now to FIG. 8, a schematic of an embodiment of the splicer 110 and a method for splicing is illustrated. The schematic is of an embodiment of the splicer 110 for use in a form, fill, and seal packaging machine, such as that illustrated in FIG. 7, for making flexible pouches housing a product from a web of film. Of course, the embodiment is given for illustrative purposes and the invention is not limited to use in a form, fill, and seal packaging machine.

The apparatus includes a sensor 150 for detecting splices so that they can be removed. As stated in the background of the invention, in certain applications, such as aseptic packaging, it may be necessary to remove tape splices. When a splice 170 is detected the feed of the web of film 113 into the packaging apparatus is halted (a). The film is then severed at a point Y upstream of the splice (b). The film can be severed by an automatic knife means 90, or can be severed manually.

The severed end of the web of film 117 is then fed through the jaws 120 and 121 so that the two ends 115 and 117 of the web of film overlap (c). The block 151 is rotated to the cutting position, i.e. the slotted side 155 or 159 faces upwardly (d). The film is then aligned to be registered with printing by exactly covering one label copy with another and/or superimposing one registration eyespot on end 117 with any other eyespot on end 115. The jaws 120 and 121 are then clamped together (e). The web of film is cut along the slot 161 by a knife 145 (f). It should be noted, that the knife 45 can be manually operated or can be an automatic knife that is incorporated into the splicing apparatus 110.

After the film is severed along the slot 161, the block 151 is rotated so that it is in the sealing position, i.e., the back up side 153 or 157 contacts the film (g). The film scrap ends 115' and 117' are then peeled back and the heat sealer 130 is actuated and the film is then sealed along the edges 117 and 115 (h). After the film has cooled sufficiently, the jaws are released (i). Accordingly, a tape splice has been removed and the film spliced together. Of course, a similar method can be utilized to splice two ends of two webs of film together to change rolls of film or to splice film together if the film breaks.

Referring back to FIG. 7, an embodiment of the splicer 110 for use in a packaging machine 200 is illustrated. As illustrated, the splicer 110 is located after the film unwind station 201 before the bath 203 for washing or sterilizing the film 13. The film is then fed into the packaging portion 205 of the machine 200 where the film is created into a flexible container for housing products.

It should be understood that various changes and modifications to the preferred embodiments described herein will be apparent to those skilled in the art. Such change and modifications can be made without departing from the spirit and scope of the present invention and without diminishing its attendant advantages. It is therefore intended that such changes and modifications be covered by the appended claims.

I claim:

1. An apparatus for splicing film comprising:
a first jaw having a first bar and a second bar;
a second jaw having a first bar and a second bar;
the first and second jaws cooperating to clamp two film ends between the first and second bars of said first and second jaws;
sealing means located in the first jaw for sealing the two ends of the film together; and
film moving means including a rotatable member having at least one side that includes a slot and at least one side that includes a backup member located within the second jaw for moving film secured between the first and second bars of the first and second jaws from a first position to a second position wherein when the film ends are in the second position the film ends are in a horizontal plane substantially the same as a horizontal plane defined between the first and second bars of the first and second jaws, and when the film ends are in the first position the portion of the film ends between the first and second bars of the first and second jaws extends outwardly from that plane a side of the rotatable member having the slot contacting the film ends when the film ends are in the first position and a side of the rotatable member having the back up member contacting the two ends of the film when the film ends are in the second position.

2. An apparatus for splicing film comprising:
a first jaw having a first bar and a second bar;
a second jaw having a first bar and a second bar;
the first jaw and second jaw cooperating to clamp two film ends between the first and second bars of the first and second jaws;
sealing means located in the first jaw for sealing the two ends of the film together
film moving means including a rotatable member having at least one side having a slot and at least one side having a backup member located within the second jaw for moving the two film ends secured between the jaws from a first position to a second position wherein when the two film ends are in the second position the film ends are in a horizontal plane substantially the same as a horizontal plane defined between the first and second bars of the first and second jaws, and when the film ends are in the first position a portion of the film ends extends outwardly from that plane; and
the rotatable member having a rectangular cross-sectional shape and a side of the rotatable member including the slot contacts the film ends when the film moving means moves the film ends to the first position and a side of the rotatable member including the back up member contacts the film when the film moving means moves the film ends to the second position.

3. An apparatus for splicing film comprising:
a first jaw having a first bar and a second bar;
a second jaw having a first bar and a second bar;
the first jaw and second jaw cooperating to clamp two film ends between the first and second bars of the first and second jaws;
sealing means located in the first jaw for sealing the two ends of the film together;
film moving means located within the second jaw for moving the film ends secured between the jaws from a first position to a second position wherein when the film ends are in the second position the film ends are in a horizontal plane substantially the same as a horizontal plane defined between the first and second bars of the first and second jaws, and when the film ends are in the first position a portion of the film ends extends outwardly from that plane; and
the film moving means includes a rotatable member having at least one side having a slot and at least one side having a back up member, each side defining a substantially rectangular surface having a surface area, the surface area of the substantially rectangular surface of a side having the slot being smaller than the surface area of the substantially rectangular surface of a side having the back up member.

4. An apparatus for splicing film comprising:
a first jaw and a second jaw, the first and second jaws cooperating to clamp two film ends together;
sealing means for sealing two film ends together the sealing means being located in the first jaw; and
a block coupled to the second jaw and located diametrically to the sealing means, having at least one side including a slot for defining a cutting surface and at least one side having a back up member for the sealing means defining a sealing surface the block having a substantially rectangular cross-sectional shape.

5. An apparatus for splicing film comprising:
a first jaw and a second jaw, the first and second jaws cooperating to clamp two film ends together;
sealing means for sealing the two film ends together the sealing means being located in the first jaw; and
a block, coupled to the second jaw and located diametrically to the sealing means, having at least one side including a slot for defining a cutting surface and at least one side having a back up member for the sealing means defining a sealing surface, each side of the rotatable member defines a substantially rectangular surface having a surface area, the surface area of a side of the block having the slot is less than the surface area of a side of the block defining the backup member.

6. The apparatus of claim 5 including means for moving the block to a first cutting position and to a sealing position.

7. The apparatus of claim 6 wherein the means for moving the block includes a rod received in an aperture in the block, the rod including at least one rotatable handle at an end thereof.

8. The apparatus of claim 5 wherein the jaws each include a first bar and a second bar, the two film ends being clamped together between the first and second bars of the first and second jaws, the first and second bars of the first and second jaws when they are clamped together defining therebetween a first horizontal plane, when the block is in the sealing position the film ends extend between the first and second bars of the first and second jaws in substantially the first horizontal plane, and when the block is in the cutting position a portion of the film ends between the first and second bars of the first and second jaws extends outwardly from the first horizontal plane.

9. The apparatus of claim 5 including a frame for supporting the first and second jaws, the first jaw being fixedly secured to the frame the second jaw being moveable within the frame.

10. The apparatus of claim 5 wherein the sealing means is rotatably secured to the frame.

11. The apparatus of claim 10 wherein the sealing means includes at least one spring biased pin for securing the heat sealing means within the frame.

12. The apparatus of claim 5 wherein the block includes two sides each having a slot and two sides each defining a back up member.

13. The apparatus of claim 5 wherein the at least one side defining the back up member includes an elastomeric face.

14. The apparatus of claim 5 wherein the sealing means includes a hot bar.

15. The apparatus of claim 5 wherein the sealing means includes an impulse sealer.

16. An apparatus for splicing film comprising:
a first jaw and a second jaw, the first and second jaws cooperating to allow film to pass therebetween and to clamp film between the first and second jaws;
a sealing means for sealing film clamped between the jaws together, the sealing means being located in the first jaw; and
a rotatable block member coupled to the second jaw and rotatable from a cutting position to a sealing position and from a sealing position to a cutting position, the rotatable block member including at least one side having a slot and at least one side having an elastomeric face, the rotatable block being in the cutting position when a side having the slot contacts a portion of the film clamped between the jaws and in the sealing position when a side having the elastomeric face contacts a portion of the web of film, the sides of the rotatable block member each define a substantially rectangular surface having a surface area and the surface area of the at least one side having the slot is less than the surface area of the at least one side having the elastomeric face.

17. An apparatus for splicing film comprising:
a first jaw and a second jaw, the first and second jaws cooperating to allow film to pass therebetween and to clamp film between the first and second jaws;
a sealing means for sealing film clamped between the jaws together, the sealing means being located in the first jaw; and
a rotatable block member, coupled to the second jaw, rotatable from a cutting position to a sealing position and from a sealing position to a cutting position, the rotatable block member including at least one side having a slot and at least one side having an elastomeric face, the rotatable block being in the cutting position when a side having the slot contacts a portion of the film clamped between the jaws and in the sealing position when a side having the elastomeric face contacts the portion of the web of film clamped between the jaws, each side of the rotatable block defines a substantially rectangular surface having a surface area the at least one side of the block having the slot having a surface area that is less than the surface area of the at least one side of the block having the elastomeric face, the rotatable block including two sides each having a slot and two sides each having an elastomeric face.

18. The apparatus of claim 17 wherein the rotatable block includes an aperture that receives a rod having at least one handle for rotating the block.

19. The apparatus of claim 18 wherein the jaws are secured between frame side members that include a slot for receiving the rod.

20. The apparatus of claim 19 wherein the sealing means is rotatably secured between the jaws by at least one fixed pin and one spring biased pin.

21. A method of splicing film comprising the steps of:
passing a first film end between a splicer having a first jaw and a second jaw, the first jaw being coupled to sealing means for sealing two film ends together and the second jaw being coupled to film moving means including a rotatable block for moving the film ends to a first cutting position and to a second sealing position each jaw including a first bar and a second bar, the first and second bars of each jaw defining when they are clamped together a horizontal plane;
passing a second film end between the first and second jaws;
rotating the rotatable block to a cutting position;
moving the jaws together and clamping the two film ends together between the first and second bars of the first and second jaws;
the rotatable block causing at least a portion of the film ends to extend outwardly from the horizontal plane;
severing the two film ends as the two film ends are in the first cutting position;
rotating the rotatable block to cause the two film ends to move to the second sealing position;
peeling back a scrap layer from the first film end and a scrap layer from the second film end; and
sealing the two remaining layers of the two film ends together with the sealing means.

22. The method of claim 21 including the step of: overlapping the two ends of the web of film.

23. The method of claim 21 including the step of aligning the two film ends before they are cut.

24. A method for splicing film comprising the steps of:
passing one film end between a splicer having a first jaw and a second jaw, the first jaw being coupled to sealing means for sealing two film ends together and the second jaw being coupled to a rotatable block having at least one cutting surface and at least one sealer back up surface;
passing a second film end between the first and second jaws;
aligning the film ends;
causing the cutting surface to contact one side of the two film ends;
moving the jaws together and clamping the two film ends together;
severing the two film ends along a slot on the cutting surface;
rotating the block so that the back up surface contacts the two film ends;
peeling back a scrap layer from the first film end and scrap layer from the second film end; and
sealing the two remaining layers of the film ends with the sealing means.

25. The method of claim 24 including the step of:
causing the cutting surface to contact one side of the two film ends by rotating the rotatable block before the jaws clamp the two film ends together and the film ends are severed.

* * * * *